United States Patent [19]

Sato et al.

[11] Patent Number: 5,081,758
[45] Date of Patent: Jan. 21, 1992

[54] ELECTRICAL INSULATING OIL COMPOSITION AND CAPACITORS PREPARED THEREWITH

[75] Inventors: Atsushi Sato, Tokyo; Shigenobu Kawakami, Chiba; Keiji Endo, Kanagawa, all of Japan

[73] Assignee: Nippon Petrochemicals Company, Limited, Tokyo, Japan

[21] Appl. No.: 697,198

[22] Filed: May 8, 1991

Related U.S. Application Data

[63] Continuation-in-part of Ser. No. 93,813, Sep. 4, 1987, Pat. No. 5,017,733.

[30] Foreign Application Priority Data

Sep. 4, 1986 [JP] Japan ............................ 61-208541

[51] Int. Cl.$^5$ ............................ H01G 4/22; H01B 3/22
[52] U.S. Cl. ............................ 29/25.41; 585/6.3
[58] Field of Search ............................ 585/63, 24, 25; 29/25.41

[56] References Cited

U.S. PATENT DOCUMENTS

| | | | |
|---|---|---|---|
| 4,586,972 | 5/1986 | Yokotani et al. | 29/25.41 |
| 4,750,083 | 6/1988 | Sato et al. | 585/6.3 |
| 5,015,793 | 5/1991 | Sato et al. | 585/6.3 |
| 5,017,733 | 5/1991 | Sato et al. | 585/6.3 |

FOREIGN PATENT DOCUMENTS 3127905 2/1983 Fed. Rep. of Germany.

*Primary Examiner*—Asok Pal
*Attorney, Agent, or Firm*—Scully, Scott, Murphy & Presser

[57] ABSTRACT

An electrical insulating oil composition which comprises 45% by weight or more of at least 2 members selected from the group consisting of (a) m-ethylbiphenyl, (b) p-ethylbiphenyl, (c) o-benzyltoluene, (d) m-benzyltoluene, (e) p-benzyltoluene, and (f) 1,1-diphenylethane; and the remainder of non-condensed bicycle aromatic hydrocarbons having not more than 17 carbon atoms besides the above 6 components; and is characterized in that, when the temperature of the composition is $-40°$ C., (I) the total quantity of solid phase obtained by calculating according to the following solid-liquid equilibrium equation is 45% by weight or less relative to the total quantity of the composition, and (II) in the liquid phase composition calculated by the following solid-liquid equilibrium equation, the total quantity of the compounds (a) to (f) is 40% by weight or more and the viscosity of this liquid phase is 500 cSt or lower, $$X_i = \exp\left[\frac{\Delta H_i^f}{R}\left(\frac{1}{T_i^f} - \frac{1}{T}\right)\right]$$

wherein $X_i$ is the equilibrium mole fraction of a component i in the liquid phase; $\Delta H_i^f$ is a heat of fusion (cal.$\mathrm{mol}^{-1}$); $T_i^f$ is a melting point (K); T is the temperature (K); and R is the gas constant (cal.mol$^{-1}$.K$^{-1}$). Electrical capacitors prepared with these electrical insulating oil compositions provide excellent operation at temperatures as low as $-40°$ C., preferably as low as $-50°$ C.

10 Claims, 5 Drawing Sheets

(*): SYMBOLS A TO D INDICATE STATES OF PARTIAL DISCHARGE AT RESPECTIVE TEMPERATURES

ELECTRICAL INSULATING OIL COMPOSITION AND CAPACITORS PREPARED THEREWITH

CROSS-REFERENCE TO RELATED APPLICATION

This application is a continuation-in-part of application Ser. No. 093,813, filed Sept. 4, 1987, now U.S. Pat. No. 5,017,733.

BACKGROUND OF THE INVENTION

1. Field of the Invention

This invention relates to an electrical insulating oil composition, a capacitor impregnated with the electrical insulating oil composition, a method for producing the capacitor and a method of operating the capacitor. More particularly, the invention relates to an electrical insulating oil composition which has high hydrogen gas absorbing capacity and can be employed in a capacitor operating at a very wide temperature range, for example, at room temperature to temperatures as low as −40° C. or −50° C.

2. Description of the Prior Art

In the conventional art, PCB (polychlorobiphenyl) was widely used as an insulating oil for high power capacitors. PCB has a high dielectric constant, however, the use of PCB was prohibited because its toxicity was found. After that, in order to provide insulating oils having a high dielectric constant, there have been proposed insulating oils comprising a mixture of chlorinated alkyldiphenyl ether, phthalic acid esters and benzene trichloride; and esters of benzyl alcohol and fatty acids.

As PCB has a high dielectric constant, a solid insulating material of insulating paper or combined films of insulating paper and biaxially oriented polypropylene film was used for capacitors. However, as the power loss of PCB and paper is large, the power loss of capacitors with these materials as the whole was large, especially at lower temperatures. For example, the loss at temperatures of +10° to +20° C. is approximately 0.1%, meanwhile the loss is abruptly increased by ten times to 1% at temperatures of −20° C to −30° C. For this reason, the generation of heat by the power loss in a capacitor cannot be disregarded and the temperature rise of 20° C. to 30° C. is caused to occur which will further depend upon the sizes of capacitors, kinds of of solid insulating materials and configurations of electrodes. As a result, even when the temperature of an insulating oil is low, for example below the pour point, the temperature is gradually raised by the internal heat generation of the capacitor. The temperature thus exceeds the pour point of the insulating oil in due course, and finally, the viscosity is lowered and the insulating oil can act as a liquid substantially. As a result, PCB was regarded that it can be used under considerably low temperature conditions. In other words, the heat generation by power loss is essentially undesirable, however, it was exceptionally regarded desirable in the case of PCB in low temperature uses.

Meanwhile, bicyclic aromatic hydrocarbons such as 1-phenyl-1-xylylethane (PXE) and monoisopropylbiphenyl (MIPB) were proposed as the substitute for PCB. The power loss of them is small as compared with that of PCB. The loss is on the level of about 0.01% to 0.02% which is one tenth of PCB capacitor. Even at temperatures as low as −40° C., the dielectric loss does not exceed 0.1%. Accordingly, the temperature rise in a capacitor owing to the power loss is generally lower than 5° C. In the case of capacitors impregnated with the bicyclic aromatic hydrocarbons, the compensation by the self heat generation of power loss in lower temperatures like PCB capacitors cannot be expected.

The insulating oils of the series of the foregoing bicyclic aromatic hydrocarbons are excellent in the partial discharge characteristics as compared with PCB and the like compounds having a high dielectric constant. In addition, the former ones are excellent also in impregnating property relative to solid insulating materials such as plastic films. Accordingly, they are mainly used for electric capacitors.

For the above reason, it has been eagerly desired to propose bicyclic aromatic hydrocarbons that are useful in lower temperatures with making the most of the advantages of the bicyclic aromatic hydrocarbons.

The insulating oils of bicyclic aromatic hydrocarbons that are used at present are the foregoing PXE and MIPB; and the mixture of monobenzyltoluene (MBT) and dibenzyltoluene (DBT). Any of these substances has a low temperature characteristic that is superior to that of PCB. In order to improve further the adaptability and the partial discharge characteristic at lower temperatures, the inventors of the present application has made detailed investigation with regard to the relation between the structures of bicyclic aromatic hydrocarbons and the properties of them as electrical insulating oils.

In the first place, alkyl groups having 1 to 5 carbon atoms were added to the skeletal carbon chains of 1,1-diphenylethane so as to synthesize the model compounds of the basic skeletal structure of bicyclic aromatic hydrocarbons. The properties as synthetic oils were investigated with regard to six kinds of synthetic oils including the compound having only the basic skeletal structure.

The structures of the synthetic oils are represented by the following structural formula:

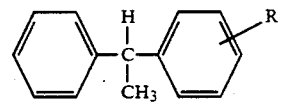

wherein R is a methyl group, two methyl groups, an ethyl group, an isopropyl group, a tert-butyl group, or a tert-amyl group.

Each of the synthetic oils was refined by clay treatment to make the dielectric loss tangent below 0.02% at 80° C., which was used by several kinds of tests as insulating oils for capacitors. In order to observe the basic properties as insulating oils, hydrogen gas absorbing capacity was measured, the results of which are shown in FIG. 1. According to these results, the hydrogen gas absorbing capacity increases with the decrease of the number of carbon atoms in substituent groups, i.e., with the rise of aromaticity (the percentage of aromatic carbons in the total structure). Taking the above fact into consideration, all-film type model capacitors were made by using the respective synthetic oils and their performance was tested.

Two sheets of 14 micrometer thick biaxially oriented polypropylene film were put together in layers. With using the thus prepared films as insulating material, aluminum foil 7 micrometers thick was wound to obtain capacitors of 0.3 to 0.4 μF.

Breakdown voltages were measured by applying electric voltages to these capacitors in a room at a temperature of 25±3° C. An electric voltage (2400 V) which corresponds to 50 V/μ in potential gradient was applied to the capacitors for 24 hours and after that, the electric voltage was raised by 10 v/μ at an interval of 48 hours. The number of capacitors was 6 for each synthetic oil and the times at which capacitors were broken down were recorded and their average was taken as the value of each group of capacitors.

The results obtained in the above tests are shown in FIG. 2. According to these results, the voltage withstanding characteristics become higher with the rise of aromaticities of the compounds, that is the lowering of molecular weights, which correspond to the tendency of hydrogen gas absorbing capacities of the compounds shown in FIG. 1.

It was understood from the results shown in FIG. 1 and FIG. 2 that the hydrogen gas absorbing capacity and the voltage withstanding characteristic become better with the lowering of the molecular weights of bicyclic aromatic hydrocarbons.

The viscosity becomes low with the lowering of molecular weight of bicyclic aromatic hydrocarbon, however, the melting point becomes high because the compound structure is simplified, which fact makes the low temperature characteristics worse.

The melting points of bicyclic aromatic hydrocarbons (non-condensed type) having 12 carbon atoms such as biphenyl and those having 13 carbon atoms, next to the lowest number of carbon atoms, such as methylbiphenyls (3 kinds of isomers of 2-methylbiphenyl 3-methylbiphenyl and 4-methylbiphenyl) are high (about 0° C. to 69.1° C.) and in addition, the flash points of them are low. Accordingly, they are not suitable as electrical insulating oils.

Therefore, as the practical electrical insulating oils, the bicyclic aromatic hydrocarbon having 14 carbon atoms are most preferable among those having not less than 14 carbon atoms.

As described above, it was understood that the bicyclic aromatic hydrocarbons having 14 carbon atoms are most excellent in view of hydrogen gas absorbing capacity and voltage withstanding characteristic.

The number of the bicyclic aromatic hydrocarbons are, however, very large as compared with those having less carbon atoms. For example, they are exemplified by dimethylbiphenyls (symmetrical derivatives and asymmetrical derivatives), ethylbiphenyls, methyldiphenylmethanes, 1,1-diphenylethane and 1,2-diphenylethane; corresponding compounds having an ethylenic double bond such as vinylbiphenyls, 1,1-diphenylethylene and 1,2-diphenylethylene (stilbene). Thus, the number of bicyclic aromatic hydrocarbons having 14 carbon atoms is particularly large as compared with the number of those having 12 or 13 carbon atoms.

It should be noted, however, that all the bicyclic aromatic hydrocarbons having 14 carbon atoms cannot always be used when they are evaluated in view of the practical electrical insulating oil. The reason for this will be described with regard to each group of compounds having 14 carbon atoms.

There are 12 kinds of position isomers of dimethylbiphenyls including symmetrical ones and asymmetrical ones.

As a method for industrially and inexpensively producing dimethylbipheny, only a method of methylation of biphenyl by Friedel-Crafts reaction is known. If it can be directly synthesized from inexpensive alkylbenzenes such as benzene, toluene and xylene, it can be obtained inexpensively. However, the economical direct synthesis is at present impossible.

In the above methylation of biphenyl, methyl groups are often introduced symmetrically due to the orientation of the substituent groups. As a result, a mixture of symmetrical compounds is obtained. For example, 2,2'-dimethylbiphenyl (melting point: +20° C.), 3,3'-dimethyl-biphenyl (melting point: +9° C.), and 4,4'-dimethylbiphenyl (melting point: +122.5° C.). All of them have high melting points Above all, the melting point of rather the main product of 4,4'-dimethylbiphenyl (p,p-isomer) is high.

Accordingly, the dimethylbiphenyls are undesirable for the inexpensive electrical insulating oil because they have too high melting points and inferior in low temperature characteristics.

Among ethylbiphenyls, there are 3 kinds of position isomers, o-ethylbiphenyl, m-ethylbiphenyl and p-ethylbiphenyl. In the industrial production of these ethylbiphenyls, ethylation of biphenyl or transalkylation of ethylbenzene with biphenyl is employed, in which most of the products are m-ethylbiphenyl and p-ethylbiphenyl, while o-ethylbiphenyl is hardly produced in this method.

Accordingly, m-isomer and p-isomer of ethylbiphenyls are practically used.

Methyldiphenylmethanes (benzyltoluenes) are industrially produced and are practically used as electrical insulating oils.

The melting point of 1,1-diphenylethane is as low as −18° C. The melting point of 1,2-diphenylethane is ±51.2° C. and the heat of fusion is 5,560 cal/mol, both are high, which are not desirable for improving the low temperature characteristics.

The vinylbiphenyl and other bicyclic aromatic hydrocarbons having 14 carbon atoms and ethylenic double bonds are undesirable as they have polymerization activity due to their double bonds. Furthermore, stilbenes are not suitable because they have high melting points and toxicity torward living bodies.

By the total evaluation as electrical insulating oils on the basis of the foregoing investigation, the following 6 kinds of components (a) to (f) in Table 1 are selected from the bicyclic aromatic hydrocarbons having 14 carbon atoms.

TABLE 1

Melting Points and Heats of Fusion of Bicyclic Aromatic Hydrocarbons Having 14 Carbon Atoms

| Compound | Melting Point (°C.) | Heat of Fusion (cal/mol) |
|---|---|---|
| (a) 3-Ethylbiphenyl (m-isomer) | −27.6 | 4000 |
| (b) 4-Ethylbiphenyl (p-isomer) | +35.5 | 2810* |
| (c) o-Benzyltoluene | +6.6 | 5000 |
| (d) m-Benzyltoluene | −27.8 | 4700 |
| (e) p-Benzyltoluene | +4.6 | 4900 |
| (f) 1,1-Diphenylethane | −18 | 4200 |
| Reference Examples | | |
| 1,2-Diphenylethane | +51.2 | 5560* |
| trans-Stilbene | +126 | 6330* |
| cis-Stilbene | +2 | 3710* |
| 2-Ethylbiphenyl (o-isomer) | −6.1 | 3890 |

In Table 1, all the melting points were quoted from published references and the heats of fusion marked with asterisks (*) were actually measured by using Specific Heat Measuring Device, HS-3000 made by Shinku Riko Co., Ltd.

In the above description with regard to the bicyclic aromatic hydrocarbons, the low temperature characteristics were briefly explained. This will be further described in the following passages.

In order to improve the low temperature characteristic of an electrical insulating oil, it is necessary that the composition in which any separation of compounds as crystals does not occur in low temperatures, namely always liquid, must be selected.

The feasibility of crystallizing out relates to viscosities. That is, it is well known that the mobility of liquid molecules is low in a high viscosity liquid and crystals are difficultly separated out even when the temperature is lower than its melting point and such a liquid is liable to become the so-called supercooled state.

The viscosities of all the foregoing 6 components in Table 1 are low under low temperature conditions and the supercooled state rarely occurs. In other words, crystals are liable to be separated out in these components when they are cooled.

There is proposed an electrical insulating oil by retarding the separating out of crystals with positively utilizing the foregoing supercooling phenomenon, in which dibenzyltoluene is mixed into benzyltoluene, one of the foregoing 6 components. This is described in Japanese Patent Publication No. 55-5689 and U.S. Pat. No. 4,523,044 and was commerciallized by Prodelec Co. in France with a trademark "JARYLEC C-100". In the abovementioned U.S. Pat. No. 4,523,044, the mixture of benzyltoluene-type oligomer and triarylmethane-type oligomer is disclosed. However, the content of triarylmethane-type oligomer is very small in the composition in examples, so that it is apparent that the main components of the composition are benzyltoluene and dibenzyltoluene.

In the above-mentioned composition, however, even when the separating out of crystals is inhibited apparently by the supercooling condition, the viscosity is naturally raised at lower temperatures. Therefore, it is not desirable as an electrical insulating oil, especially as the oil for capacitors.

This fact was confirmed by tracing the disclosure of above-mentioned U.S. Pat. No. 4,523,044.

In the like manner as the example in the above reference, benzylchloride and toluene were reacted by using a catalyst of $FeCl_3$; and benzyltoluene and dibenzyltoluene were obtained by distillation. These benzyltoluene and dibenzyltoluene in a weight ratio of 80:20 were mixed together. The contents of isomers of the benzyltoluene in the obtained mixture were o-isomer: 39.1 wt%, m-isomer: 5.4 wt% and p-isomer: 35.5 wt%, which were almost coincident with the analytical values of the above commercial sample JARYLEC C-100 of o-isomer: 36.2 wt%, m-isomer: 5.9 wt% and p-isomer: 37.8 wt%.

The above synthesized benzyltoluene, benzyltoluene/dibenzyltoluene mixture, and JARYLEC C-100 were respectively put in stoppered test tubes. They were left to stand in a temperature-programmable refrigerator to observe the state of separating out of crystals. One temperature cycle was 12 hours between −40° C. and −50° C.

According to the results of this test, crystals were separated out after 1 to 3 days and the whole was solidified in the case of only benzyltoluene. In the case of the mixture of benzyltoluene/dibenzyltoluene and JARYLEC C-100, the separating out of crystals began after 4 to 7 days and crystals grew gradually, and after 2 weeks, crystals were observed on almost all the walls of test tubes. That is, the viscosity was increased by the addition of dibenzyltoluene to maintain the supercooled state long, and the time period for crystallizing out was prolonged. Accordingly, even though crystals were separated out finally, the crystallizing out was retarded by the addition of dibenzyltoluene.

More particularly, with regard to the isomer mixture of benzyltoluene (o-isomer: 48.9 wt%, m-isomer: 6.8 wt% and p-isomer: 44.3 wt%) obtained in the tracing test of the foregoing U.S. Pat. No. 4,523,044, the quantities of solid phase at several temperatures were calculated in accordance with the following equation of solid-liquid equilibrium, the results of which are shown in FIG. 3.

In the same drawing, the o-isomer is separated out between the points A and B, and the o-isomer and the p-isomer are simultaneously separated out between the points B and C. At point C, the m-isomer participate in them to be separated out together. This point is the eutectic point (−38.9° C.) at which the three components are simultaneously separated out to become a solid. In this drawing, even though the quantity is small, crystals are separated out between −14° C. and −15 C. Accordingly, an isomer mixture of benzyltoluene of the same composition was prepared and it was cooled to a temperature below the eutectic point to change all of them into a solid. After that, the temperature was gradually raised and observed the temperature at which the crystals melted away. The temperature was well coincident with the foregoing temperature within a range of 1° to 2° C.

As described above, benzyltoluene is used with adding dibenzyltoluene in the disclosure of U.S. Pat. No. 4,523,044.

Accordingly, 20% by weight of dibenzyltoluene was added to benzyltoluene. Provided that the dibenzyltoluene is non-crystalline, that is, it is always in a liquid state, as described in the above reference, the relation between the solid-liquid equilibrium and temperatures is in the state as shown in FIG. 4.

According to FIG. 4, the beginning temperature of crystallizing out is lower by about 5° C. as compared with that of FIG. 3. After exceeding −20° C., o-benzyltoluene and p-benzyltoluene begin to separate out. The proportion of solid phase already exceeds 50 wt% at −30° C., 64.5 wt% at −45° C. and 69.3 wt% at −50° C.

In comparison with the foregoing FIG. 3, the composition is not all solid even in the low temperature of −40° C. to −50° C. That is, the composition is apparently improved in view of the existence of the liquid phase. However, in the liquid phase composition with regarding the whole of liquid phase as 100%, the proportion of the dibenzyltoluene is 42% at 30° C., 56% at -40° C. and as much as 65% at −50° C. Thus, in low temperature region, the proportion of the dibenzyltoluene which is unavoidably added in order to lower the melting point exceeds one half quantity in the important liquid phase.

Accordingly, another mixture of benzyltoluene and dibenzyltoluene was prepared so as to correspond to the above liquid phase portion, and the viscosity was measured. As a result, it was understood that the viscosity was too high to be measured at −50° C.

As described above, the crystallizing out can be surely avoided by mixing the dibenzyltoluene, however, this phenomenon is owing to the increase of viscosity. Therefore, it is not desirable.

The above depends upon the solid-liquid equilibrium in which 20 wt% of dibenzyltoluene is mixed. When the quantity of dibenzyltoluene is reduced to a level lower than 20 wt%, the effect to improve the melting point is lowered. On the other hand, when more than 20 wt% is added even though the melting point is lowered, the viscosity is increased to impair the advantage of the benzyltoluene.

As the condition for an insulating oil having a good low temperature characteristic, especially for the one used in capacitors, the reason for taking notice of the viscosity is as follows:

If there is neither foreign substance nor defect in crystalline structure in solid insulating materials such as film or paper, or there is no weak deteriorated portion of the film caused by an insulating oil, the partial discharge at lower temperatures will firstly occur and the solid insulating materials then suffer damages or the partial discharge expands, thereby the capacitor being broken down.

The conditions until the beginning of partial discharge is considered as follows:

As a preliminary phenomenon, the electric potential is concentrated to the projected portions of electrode or weakened portions of solid insulating material and gases, mainly hydrogen gas, are produced from the insulating oil surrounding the above portions Gas is produced from one portion at times, or it is produced from plurality of points simultaneously. The produced gas is dissolved in the insulating oil in the initial stage and it is diffused by the difference in gas concentration or the movement of liquid. Meanwhile, because the bicyclic aromatic hydrocarbons generally can absorb hydrogen gas, it is considered that the absorption of gas is occurring in other portions where gas is not produced. When the quantity of produced gas exceeds the quantities to be diffused and absorbed, it exceeds the saturation level and minute bubbles are produced to cause the discharge. One of parameters for controlling this phenomenon is the difficulty in gas generation of an insulating oil, which is considered to be closely related to the hydrogen gas absorbing capacity of the insulating oil. Another parameter is the rate of gas diffusion in the insulating oil. It is considered that the gas diffusion is caused by the combination of the phenomenon of diffusion by the difference in gas concentrations and the phenomenon of transfer of gas by the flow of liquid. Both of these two phenomena are functions of viscosity. If a temperature is the same, it is considered that a lower viscosity is advantageous because the rate of diffusion is large.

With regard to the low temperature characteristic, if the insulating oil must be completely liquid at low temperatures such as −40° C. to −50° C., or in other words, if any solid phase (crystalline phase) must not exist at all, the range of selection of an insulating composition is quite narrow.

In order to discuss the relation between the existence of solid phase and the partial discharge with developing the problem, the following assumption is made. The beginning of crystallizing out occur at many irregular points and crystals gradually grow. When the crystals happen to cover relatively weak portions such as the peripheries of electrode and defective portions of solid insulating material into which electric potential is concentrated, the function of the insulating oil is hindered to cause the occurrence of partial discharge by the load of low electric voltage. With such the assumption, the relation between the lowering of partial discharge owing to the crystallizing out and the quantity of crystals depends upon the probability of the existence of crystals in the relatively weak portions. Accordingly, if a small amount of crystals are separated out, the partial discharge can occur even though its occurrence probability is small. Therefore, it will be accepted that the electrical insulating oil in which the possibility of solid phase to exist is high at low temperatures, is not desirable as an electrical insulating oil for use at low temperatures.

In view of the above, when the foregoing 6 components in Table 1 are considered to be used at a low temperature of −40° C. or −50° C., without saying the use of a single compound, the use of the composition of mixtures of 2 components, or even 4 or 5 components is quite difficult even when the depression of melting points among the components are taken into consideration. For example, when the formulation of an insulating oil can be made with a mixture of 3 or more components in Table 1, the ranges of mixing ratios of the composition are quite narrow, which may not be practically applicable.

It should be emphasized here that, as is apparent from Table 1 above, the melting points and heats of fusion of the position isomers of ethylbiphenyl and benzyltoluene are considerably different (note the data for the o, m and p isomers). This fact can be applied not only to the above two compounds but also to other position isomers.

That is, in order to improve the low temperature characteristics, it is necessary to evaluate the influence of any position isomers which may be present.

For example, in U.S. Patent No. 4,320,034, a composition of methyl nuclear derivative of diphenylethane and lower alkyl derivative of diphenyl (biphenyl) are disclosed. However, there is no appreciation in this disclosure of the possible importance of the position isomers on the low temperature properties of the oil compositions.

Similarly, U.S. Patent No. 4,493,943 disclosing phenyl-methylphenylmethane (benzyltoluene) does not consider the possible effect of any position isomer.

The above two patent specifications do not consider the viscosity of liquid phase or the components in the liquid phase.

Accordingly, improvements in the low temperature characteristics of oil compositions are not addressed or suggested in the teachings of the above two patent specifications.

BRIEF SUMMARY OF THE INVENTION

Inventors of the present application made detailed investigation by experiments with regard to the relation in the calculated proportions of solid phase in liquid insulating oils at lower temperatures of −40° C. to −50° C. As a result, the present invention has been accomplished.

It is therefore the object of the present invention to provide an improved electrical insulating oil composition which is excellent in low temperature characteristics.

Another object of the present invention is to provide an improved electrical insulating oil composition which also has other excellent electrical characteristics.

A further object of the present invention is to provide an improved electrical insulating oil composition which can be easily produced and used in the practical industries.

That is, the present invention relates to a multi-component electrical insulating oil composition. The insulating oil composition comprises 45% by weight or more of at least 2 members selected from the group consisting of the 6 components (a) to (f) indicated in the foregoing Table 1 and the remainder of non-condensed bicyclic aromatic hydrocarbons having not more than 17 carbon atoms besides the above 6 components. The electrical insulating oil composition of the present invention must meet the following conditions (I) to (III):

(I) the total quantity of solid phase of each component calculated according to the following general solid-liquid equilibrium equation is 45% by weight or less at a temperature of −40° C., preferably at −50° C.

$$X_i = \exp\left[\frac{\Delta H_i^f}{R}\left(\frac{1}{T_i^f} - \frac{1}{T}\right)\right]$$

wherein $X_i$ is the equilibrium mole fraction of a component i in the liquid phase of the composition, $\Delta H_i^f$ is the heat of fusion (cal.mol$^{-1}$) of the above component as a pure substance, $T_i^f$ is the melting point (K) of the above component as a pure substance, T is the temperature (K) of the system, and R is the gas constant (cal.mol$^{-1}$.K.$^{-1}$).

In the above equation, activity coefficient, $r_i$, corresponding to each component i is usually included However, according to the inventors' experiments, even when the calculation was carried out with assuming the value as 1, the calculation results were well coincident with the results of experiment. Therefore, the value of r' was regarded as 1.

(II) When the composition of the liquid phase in the insulating oil composition at −40° C., preferably at −50° C., is calculated according to the above solid-liquid equilibrium equation, the viscosity of the calculated liquid phase composition is not higher than 500 cSt at −40° C., and preferably not higher than 2,000 cSt at −50° C.

(III) In the liquid phase composition of the electrical insulating oil composition at −40° C., preferably at −50° C., the total quantity of the hydrocarbons (a) to (f) is 40% by weight or more.

In the above condition (I), when position isomers having different melting points and heats of fusion are present, the equation applies to each position isomer. In other words, the above solid-liquid equilibrium equation is separately and independently applicable to each isomer which is different in its melting point or heat of fusion.

BRIEF DESCRIPTION OF THE DRAWINGS

These and other objects and features of the present invention will become more apparent from the following description taken in connection with the accompanying drawings, in which.

DETAILED DESCRIPTION OF THE INVENTION

Figure 1:
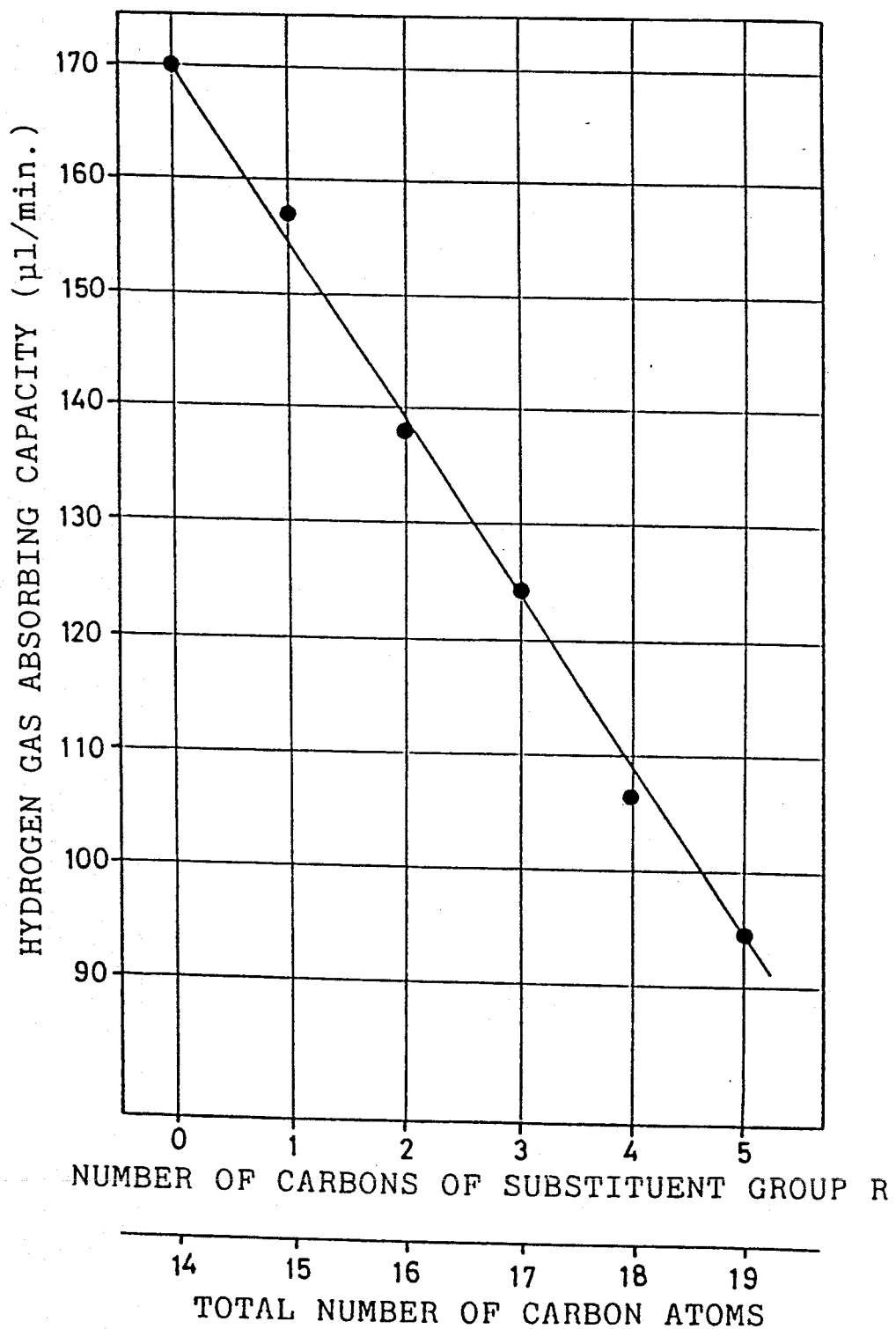
FIG. 1 is a graphic chart showing hydrogen gas absorbing capacities of bicyclic aromatic hydrocarbons.
Figure 2:
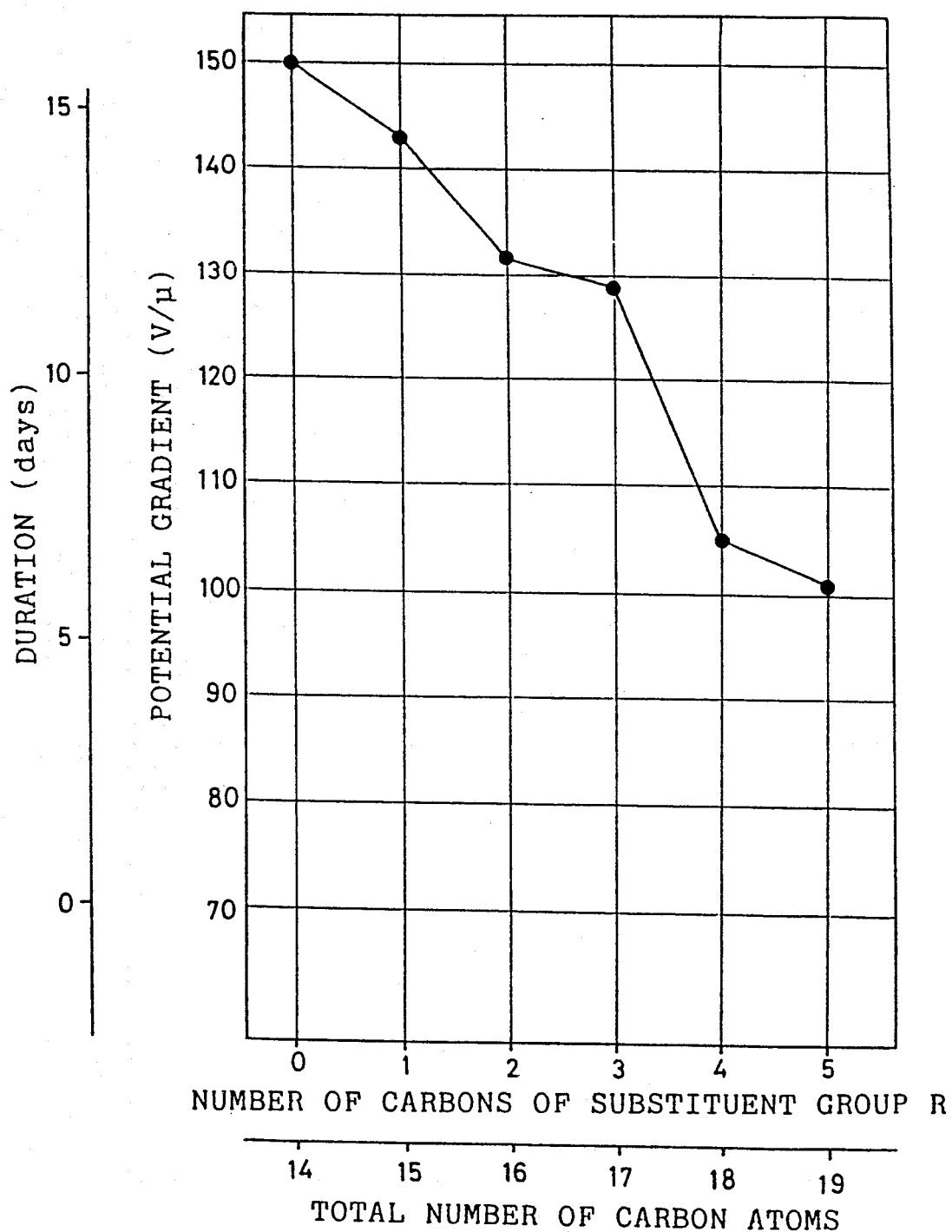
FIG. 2 is a graphic chart showing voltage withstanding characteristics of capacitors.
Figure 3:
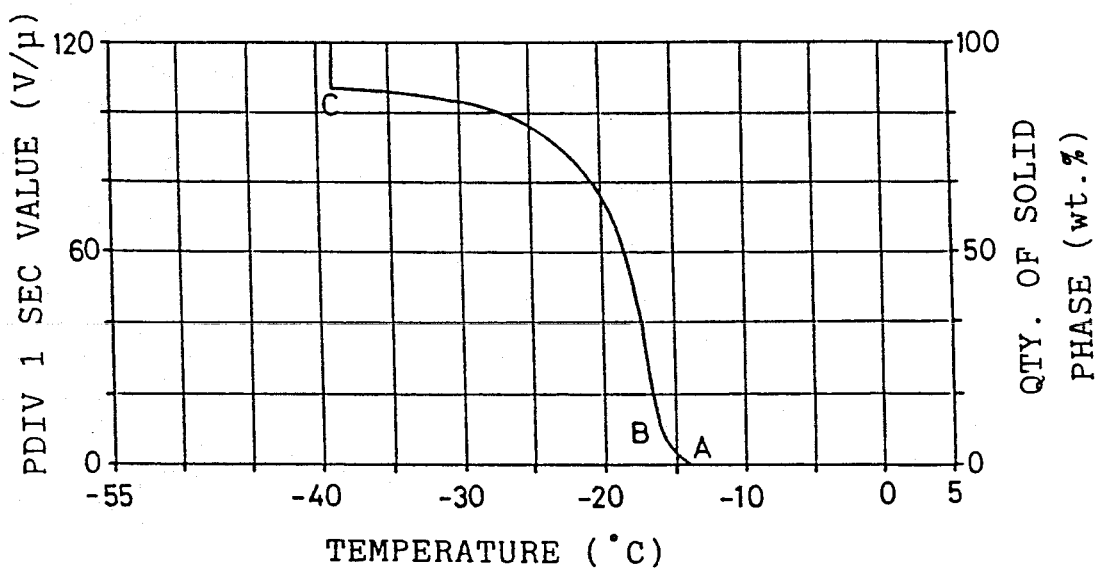
FIG. 3 is a graphic chart showing the solid-liquid equilibrium of benzyltoluene.
Figure 4:
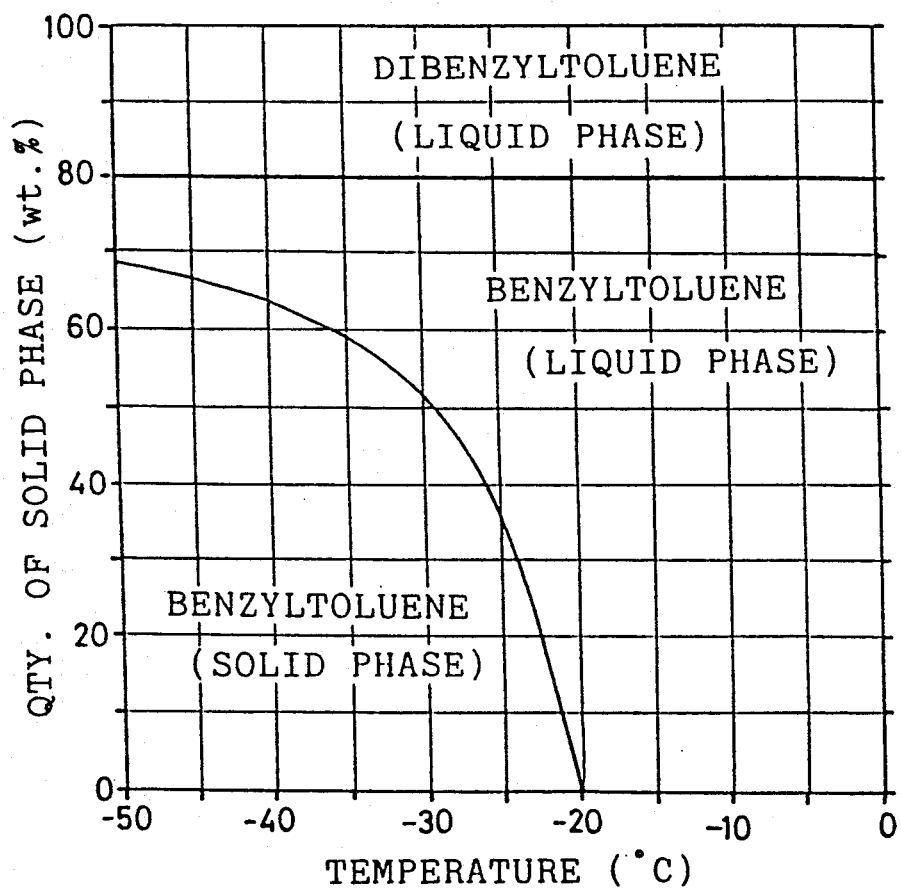
FIG. 4 is a graphic chart showing the solid-liquid equilibrium of a mixture of dibenzyltoluene.

The present invention will be described in more detail.

The electrical insulating oil composition of the present invention is prepared by mixing at least 2 components selected from the group consisting of the foregoing 6 components (a) to (f) and bicyclic aromatic hydrocarbons having not more than 17 carbon atoms other than the above 6 components.

Most of the above-mentioned 6 components (a) to (f) are position isomers which are simultaneously produced in the preparation process. Accordingly, the electrical insulating oil composition of the present invention can be produced at low cost by using 2 or more of these by-products (or series products). Furthermore, it is possible to produce the effect of the depression of melting point (freezing point) among the components by the use of a plurality of components. Of course, the electrical characteristics such as hydrogen gas absorbing capacity and voltage withstanding property of the components (a) to (f) are practically quite excellent.

The composition according to the present invention contains bicyclic aromatic hydrocarbons having not more than 17 carbon atoms in addition to the above components (a) to (f). The viscosity at low temperatures of the composition can be reduced by restricting the number of carbon atoms to 17 or less. Furthermore, because the molecular weights of them are low, it is possible to expect a larger effect of the depression of melting point (freezing point). That is, the depression of melting point is generally proportional to the moles of added substance. Accordingly, if the weights of addition are the same, the smaller the molecular weight, the larger the number of moles, and larger depression of melting point can be expected.

In the composition of the present invention, however, 45% by weight or more of the components (a) to (f) are contained. In other words, the proportion of the bicyclic aromatic hydrocarbons having 2 aromatic rings and not more than 17 carbon atoms, is 55% by weight or less. The electrical insulating oil composition containing less than 45% by weight of the components (a) to (f) is not desirable because the excellent characteristics of the components (a) to (f) cannot be fully utilized.

For example, an electrical insulating oil composition containing 37.6% of benzyltoluene is disclosed in Example 1 of West German Laid-Open Patent Publication No. 3127905. According to the experiments done by the present inventors, the electrical characteristics, especially the low temperature characteristics, were not always good in the capacitors which are impregnated with this composition.

Therefore, in the electrical insulating oil composition of the present invention, the content of these components (a) to (f) is 45% by weight or more in order to utilize the excellent properties of them.

Meanwhile, in order to produce the effect of the depression of melting point (freezing point) of the bicyclic aromatic hydrocarbons having 17 or less carbon atoms, it is necessary that at least 10% by weight, more preferably a proportion of 15% by weight, of the above aromatic hydrocarbons must be added.

The above bicyclic aromatic hydrocarbons are non-condensed type and are represented by the following general formulae (I) or (II), provided that the foregoing compounds (a) to (f) are excluded.

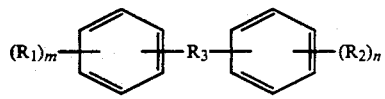
(I)

wherein each of m and n is an integer of 0 to 3, $R_1$ of m in number and $R_2$ of n in number are the same or different, and the sum of carbon atoms in $R_1$ of m in number and $R_2$ of n in number is 5 or less.

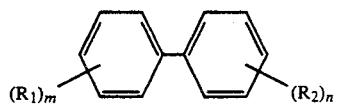
(II)

wherein each of m and n is an integer of 0 to 3, $R_1$ of m in number and $R_2$ of n in number are the same or different, and the sum of carbon atoms in $R_1$ of m in number and $R_2$ of n in number is 5 or less.

Exemplified as the hydrocarbons of the formula (I) are diphenylmethane, phenylxylylmethane, phenyl-isopropylphenylmethane, 1-phenyl-1-xylylethane, 1-phenyl-1-isopropylphenylethane, 1-phenyl-2-isopropylphenylethane, 2,2-diphenylpropane, 2-phenyl-2-tolylpropane, and 2-phenyl-2-xylylpropane.

Exemplified as the compounds of the formula (II) are methylbiphenyl, dimethylbiphenyl, trimethylbiphenyl, butylbiphenyl and diethylbiphenyl.

The above exemplified compounds of the formulae (I) and (II) include their position isomers and corresponding compounds having olefinic double bonds, if they exist.

As described above, the composition of the present invention comprises the components selected from the foregoing components (a) to (f) and other aromatic hydrocarbons having 17 or less carbon atoms, and this composition must meet the following conditions.

That is, the total of solid phase of the respective components in the composition that are calculated according to the above solid-liquid equilibrium equation, is 45% by weight or less relative to the composition at $-40°$ C., preferably at $-50°$ C.

For calculating the quantity of solid phase according to the foregoing solid-liquid equilibrium equation, conventional calculation method in physical chemistry can be used on the assumption that liquids are mutually compatible and solids are mutually incompatible. In the case of multi-component systems, it is convenient to use a computer which permits the calculations to be made rapidly even when a composition requires many components and a large number of compositions are to be prepared. Accordingly, any particular composition can be obtained without difficulty. The calculation with regard to a simple two-component system is described in Physical Chemistry (Walter J. Moore, second ed., Published by Prentice-Hall).

The exemplary calculation on solid phase will be described briefly. Assuming that a liquid insulating oil consists of Substance A and Substance B. The eutectic point of this two-component system can be obtained by solving two simultaneous equations of the foregoing solid-liquid equilibrium equation in Substance A and another equation in Substance B.

When the temperature of a system is below the above obtained eutectic point, all the components of this composition are solidified, so that the proportion of solid phase is 100%.

When the temperature of a system is above the eutectic point, the temperature of the system is substituted for the temperature of the solid-liquid equilibrium equation to obtain the respective mole fractions $X_A$ and $X_B$. They are then compared with the mole fractions $X^1_A$ and $X^1_B$ for 100% liquid, respectively. If the value of $X^1_A - X_A$ is positive, the amount of Substance A corresponding to this value separates out as crystals. In connection with B, the amount to be separated out can be calculated likewise. The sum of these values is the quantity of solid phase in the system. Incidentally, because the quantities of each substances that are separated out can be known, the composition of the relevant liquid phase can be calculated by inverse operation.

As described above, the total quantity of solid phase calculated at $-40°$ C., preferably at $-50°$ C., in the electrical insulating oil composition of the present invention is 45% by weight or less. If the quantity of solid phase exceeds 45% by weight, the starting voltages of partial discharge is liable to vary and not reproducible in the capacitors that are impregnated with such a composition. When the quantity of solid phase increases up to 100% or so, the starting voltage of partial discharge is very low like the capacitor which is not impregnated with an insulating oil. In other words, even when the solid phase exists in an amount up to 45% by weight, the function of the composition is like that of oil in which the phase is completely liquid, that is, no solid phase exists.

Even when the quantity of solid phase is as much as approximately 45% by weight, the reason why the composition exhibits the characteristics just like those of all liquid phase composition is supposed as follows:

It is considered that the cause for the lowering of insulating properties in this system by the existence of solid phase is basically due to the extent or continuity of the liquid phase in contact with the portions to give rise the partial discharge, rather than the phenomenon to impair the function by the deposition of solid phase to electrode.

When the partial discharge is caused to occur, it is considered that gases, mainly hydrogen gas, are previously generated. When the concentration of gases increased partially, it exceeds its saturation level to produce bubbles and causes the partial discharge. The consumption of energy begins before the occurrence of the partial discharge and the portions microscopically close to the point of partial discharge will be in the state of liquid. In this state, it is important that the generated gas is diffused into other portions within its solubility and it is consumed in the other points by gas absorption. The gas diffusion herein referred to includes the movement of the gas dissolved in a liquid by the difference in gas concentration and also the movement of the liquid itself dissolving the gas. In order to facilitate these movements, the sufficient liquid phase must exist in a continuous state in the neighborhood.

In the event that the total amount of solid phase exceeds 45% by weight, the liquid phase becomes discontinuous to form separated dispersion phase, so that the abovementioned mass transfer does not occur smoothly.

Meanwhile, if the amount of solid phase is not more than 45% by weight, the volume of liquid phase becomes considerably large by the reduction of volume in solidifying. Even when the overall appearance of the insulating oil is full of crystals, it is considered that the liquid phase exists substantially in a continuous phase.

Therefore, it functions just like the condition of all liquid phase. In order to make an all liquid phase composition without any solid phase, the kinds of components and the quantities and ranges of components are severely restricted, which is of no practical use. However, according to the present invention, the existence of solid phase is allowed to some extent, which facilitates the the selection of the kinds of components and their quantities. Therefore, the present invention is quite advantageous.

In the composition of the present invention, the composition of liquid phase at −40° C. is calculated according to the foregoing solid-liquid equilibrium equation and the liquid phase composition has a viscosity of 500 cSt or less. The viscosity of the liquid composition is preferably not higher than 2,000 cSt at −50° C. The calculation for this liquid composition can be done in the like manner as the foregoing calculation for the quantity of solid phase. The viscosity is measured at −40° C. or −50° C. with regard to a calculated liquid composition that is separately prepared As described above, because the viscosity of the present composition at lower temperatures is low, the defects attributable to the high viscosity like those described in U.S. Pat. No. 4,523,044, can be eliminated. Because crystals are liable to be separated out in a low viscosity liquid, the quantity of the solid phase is limited in the present invention as described above. When the viscosity of the liquid phase of composition at −40° C. exceeds 500 cSt, mass transfer becomes insufficient and the absorption and diffusion of generated gas, as a preliminary phenomenon of the partial discharge, are inhibited, which undesirably impairs the low temperature characteristics of the capacitors impregnated with the composition.

Furthermore, in the liquid phase of the electrical insulating oil composition of the invention contains 40% by weight or more in total of the foregoing bicyclic aromatic hydrocarbons (a) to (f) at −40°, preferably −50° C. Any of the compounds (a) to (f) practically excels in electrical characteristics such as hydrogen gas absorbing capacity and voltage withstanding characteristic. Therefore, the composition of the present invention can have excellent electrical characteristics, however, when the total amount of these compounds in the liquid phase at −40° C., preferably at −50° C is less than 40% by weight, it is not desirable because such an effect cannot be expected. The contents of them in the liquid phase can be calculated according to the foregoing solid-liquid equilibrium equation as described above. Practical measurement can be done of course with regard to the system at a temperature at which any solid phase does not exist.

As described in the above passages, the components of the above compounds (a) to (f) and bicyclic aromatic hydrocarbons other than the compounds (a) to (f) are selected so as to meet the foregoing conditions (I) to (III) to determine the compounding ratio, thereby obtaining the electrical insulating oil composition of the present invention.

When the electrical insulating oil composition according to the present invention is used, other known electrical insulating oils and also known additives can be added at arbitrary ratios within the object of the invention. Exemplified as such electrical insulating oils are dibenzyltoluene and diisopropylnaphthalene.

The capacitors that are suitable for the impregnation with the electrical insulating oil composition of the present invention are the so-called foil-wound capacitors. The capacitors of this kind are made by winding metal foil such as aluminum foil as an electrode together with plastic film as a dielectric or insulating material in layers to obtain capacitor elements, which are then impregnated with an electrical insulating oil. Though insulating paper can be used together with the plastic film, the use of plastic film only is preferable. As the plastic film, polyolefin film such as biaxially oriented polypropylene film is desirable. The impregnation of the electrical insulating oil composition into the capacitor elements can be done according to the conventional method.

In the present invention, an insulating oil having excellent hydrogen gas absorbing capacity and voltage withstanding characteristic can be prepared because it contains, as inevitable components, the specific bicyclic aromatic hydrocarbons having 14 carbon atoms. Furthermore, because two or more of the compounds having 14 carbon atoms can be selected, the composition allows to contain position isomers that are simultaneously produced. Therefore, the mixture produced by ordinary preparation process can be utilized with an economical advantage. Of course, the effect of depression of melting point can be produced in the multi-component composition.

Still further, the bicyclic aromatic hydrocarbons having not more than 17 carbon atoms other than the above specific bicyclic aromatic hydrocarbons can be used. Because they are low in molecular weights, the depression of melting point and lowering of viscosity can be attained.

Accordingly, it is possible to prepare an electrical insulating oil composition having not only good electrical characteristics such as hydrogen gas absorbing capacity and voltage withstanding characteristic but also good low temperature characteristics. Therefore, the capacitors which are impregnated with this insulating oil composition are quite excellent.

Experiment 1

The capacitors used in the experiment were as follows:

As the solid insulating material, a simultaneously stretched biaxially oriented polypropylene film of impregnation type that was made by Shin-etsu Film Co., Ltd. through tubular method, was used.

Two sheets of the film of 14 $\mu$ thick (micrometer method) was wound together with an electrode of aluminum foil to make capacitor elements of 0.3 to 0.4 $\mu$F in electrostatic capacity, which were put in a tin can.

The can was flexible one so as to compensate the shrinkage of an insulating oil at low temperatures. The end portion of the electrode was not folded and left in the state as slit.

As the method to connect the electrode to a terminal, it is commonly done that a ribbon-like lead foil is inserted to the face of electrode in the capacitor element. With this method, the contact between the lead foil and the electrode becomes worse when crystals separate out and partial discharge occurs on the electrode, which makes the measurement impossible. In this experiment, therefore, the electrode was wound with its end protruded from the film and the protruded portions were connected together to the lead foil by spot-welding.

The thus prepared can-type capacitors were subjected to vacuum drying in an ordinary manner, and under the same vacuum condition, it was impregnated with an insulating oil, which was followed by sealing. It was then subjected to heat treatment at a maximum temperature of 80.C for 2 days and nights in order to make the impregnation uniform and stabilized. After leaving it to stand at room temperature for 5 days, AC 1400 V (corres. to 50 V/$\mu$) was applied to the capacitor for 16 hours in a thermostat at 30° C. and it was used for experiment.

The electrical insulating oil used here was an isomer mixture of benzyltoluenes that were synthesized from benzylchloride and toluene using $FeCl_3$ catalyst as disclosed in the foregoing U.S. Pat. No. 4,523,044. The composition thereof was 48.9 mole % of o-isomer, 6.8 mole % of m-isomer and 44.3 mole % of p-isomer.

A power supplier having a mechanism (zero cross start) which is started when alternating voltage became 0 after switched on, was used.

The charge of voltage was started at a value which is 20 V/$\mu$ higher than the above presumed partial discharge initiating voltage (PDIV) in the conventional measuring method of the ramp test. The time length to start partial discharge (hereinafter referred to as "PDST" was measured with maintaining the voltage constant. The detection of discharge and measurement of time were done by a data processing device of a precision of 0.02 second that was installed with a microprocessor. The voltage was then lowered by 5 V/$\mu$ to measure PDST. After that, the voltage was lowered by 5 V/$\mu$ step by step until the measured time exceeded 1 second. "The voltage by which partial discharge occurs after 1 second" was obtained by interpolation, which value is hereinafter referred to "PDIV 1 sec value".

As is clearly understood from the following description, the data using PDIV 1 sec values were very reproducible as a measurement method.

Using 5 model capacitors, the measurement was done 5 times for each capacitor to obtain 25 resultant values.

In the cooling for measurement, the capacitors were cooled for 1 week with the cycles in which they were cooled at the measuring temperature in the daytime and then kept at a temperature lower by 10° C. in the nighttime. After that, they were left to stand at the measuring temperature for 24 hours and measured. In the measurement of PDIV, the cooling at the lowest temperature was done in the like manner as the above and the temperature was then raised to a higher measuring temperature and capacitors were left to stand for 24 hours, and after that, they were measured.

As a result, PDIV 1 sec values varied in the range of 20 to 35 V/$\mu$ at $-40°$ C. and $-50°$ C. At -30° C. and -20 C., the average data was improved, however, the dispersion of data was increased. At $-17°$ C. exceeding $-20°$ C., the PDIV 1 sec value became abruptly higher. After that, reproducible data were obtained to the temperature of 0° C. In order to rearrange these data, the quantities (wt. %) of solid phase in the benzyltoluene isomer mixture for impregnating capacitors at the respective temperatures were calculated according to the foregoing equation of solid-liquid equilibrium. The obtained values and maximums and minimums of PDIV 1 sec values were plotted on FIG. 5.

Figure 5:
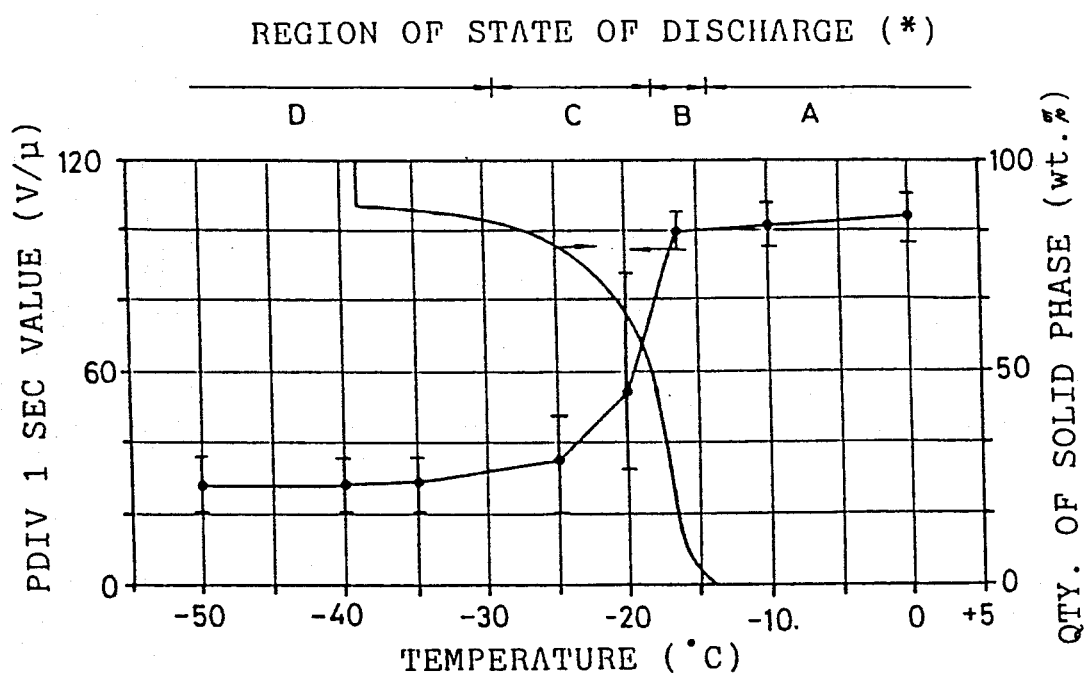
FIG. 5 is a graphic chart showing the relation between amounts of solid phase and PDIV 1 sec values, wherein the vertical range on each dot indicates the range of variation of PDIV 1 sec values.

As will be understood from FIG. 5, the whole was solid at $-40°$ C. and $-50°$ C., at which PDIV 1 sec values were very low and almost the same as the capacitors that were not impregnated with an insulating oil. In a region from $-20°$ C. to $-30°$ C., PDIV 1 sec values varied widely and, according to the calculation at the respective temperatures, about 34% by weight and about 15% by weight of liquid phase were contained, respectively. That is, the ratio of solid phase was larger and the amount of insulating oil as a liquid was unsatisfactory to impregnate, or the end portions of electrodes in which partial discharge is liable to occur were covered by crystals of solid phase, therefore, it is considered that the PDIV 1 sec value varied widely.

Meanwhile, at $-17°$ C. which is slightly higher than $-20°$ C. by 3° C., 23% of solid phase exist according to calculation, however, all the 25 data was on the extension line of PDIV 1 sec values at $-10°$ C. and 0° C. in which no solid phase existed. If any partial discharge was caused to occur even partially in the portions covered by crystals of solid phase, the lowering of PDIV 1 sec value might be observed in all probability, practically, however, all the 25 data showed almost the same PDIV 1 sec values as those of $-10°$ C. and 0° C. From this fact, it should be noted that PDIV 1 sec value is improved critically at $-17°$ C. Incidentally, the calculated quantities of solid phase considerably varies in the range between $-20°$ C. and $-17°$ C. This depends on the fact that the melting point of the eutectic composition of the two components of o-benzyltoluene and p-benzyltoluene, i.e. the main components of the impregnaping oil, exists near this temperature range.

In order to clarify the relation between the quantities of solid phase and PDIV 1 sec values, symbols for each temperature region (region for each solid ratio) is defined as follows, taking the case of FIG. 5.

Region A:

An electrical insulating oil exists only in the state of liquid phase, PDIV 1 sec value is stable on a higher level, and of course reproducibility is good.

Region B:

The solid phase exists, however, PDIV 1 sec value exists on the extension line of the Region A, PDIV 1 sec value is on a higher level, and reproducibility is good.

Region C:

The solid phase exists, PDIV 1 sec value has no reproducibility. That is, PDIV 1 sec value sometimes shows a level near Region B, or it is on a very low level.

Region D:

Almost all are solid phase or the solid phase is much. PDIV 1 sec value is on a very low level, however, its reproducibility is good.

FIG. 5 will be explained with the above definitions. The temperature region in which the solid phase exists and the calculated proportion of solid phase to the insulating oil is not more than 45% by weight, is the foregoing Region B. PDIV 1 sec value is reproducible and even though the level of PDIV 1 sec value is a little low, it exists on the extension line of the region of higher temperatures, i.e. Region A in which no solid phase exists.

As shown in the below-described Experiments 2 to 13, it was confirmed that this phenomenon occurs at far lower temperatures of $-40°$ C. and $-50°$ C.

Experiment 2

The compounds shown in the following Table 2 were used as the non-condensed bicyclic aromatic hydrocarbons having not more than 17 carbon atoms, and several compositions were prepared as shown in Table 3.

With regard to these insulating oil compositions, impregnated capacitors were made in the like manner as Experiment 1 and PDIV 1 sec values were measured at 25° C. (R.T.), −40° C. and −50° C. The results are also shown in Table 3. In accordance with the foregoing solid-liquid equilibrium equation, the proportions of solid phase and the proportions of compounds (a) to (f) in the liquid phase were calculated. Furthermore, the calculated liquid phase compositions were prepared and their viscosities were also measured. All results of them are shown in Table 3 (the liquid phase viscosity at 25° C. is not indicated).

All the above data are actually measured by using a Specific Heat Measuring Device, HS-3000 made by Shinku Riko co., Ltd.

The isopropyldiphenylmethanes of No. 3 to 5 were separately synthesized and used for measurement.

The 1-phenyl-1-ethylphenylethane and m-isopropylbiphenyl were cooled in the temperature cycles in the range of −50° C. and −60° C., however, any crystals were not separated out. Therefore, in this experiment, the liquid compositions were calculated assuming that they are non-crystalline, that is, always in liquid state.

Furthermore, the PXE mixture consisted of 1,1-diarylethanes having 16 carbon atoms in Table 2 excluding m-PXE and p-PXE that were obtained by reacting $C_8$-alkylbenzene with styrene in the presence of an acid catalyst. With regard to these compounds, the separation of crystals was not observed by cooling them in the temperature cycles of −50° C. to −60° C. Accordingly, with regard to PXE mixtures, the liquid compositions were calculated as they are non-crystalline.

A higher PDIV 1 sec value is desirable because it means that the partial discharge is started at a higher voltage. Furthermore, it is desirable that the difference between a maximum and minimum in PDIV 1 sec value is small because it shows a stable state. In an unstable partial discharge state with a larger difference, the Partial discharge phenomenon is liable to result in the breakdown of capacitors.

TABLE 2

Melting Points and Heats of Fusion of Additive Components

| No. | Compound | Melting Point (°C.) | Heat of Fusion (cal/mol) |
|---|---|---|---|
| 1 | 1-Phenyl-1-(2,4-dimethylphenyl)ethane (m-PXE) | −7 | 4,200 |
| 2 | 1-Phenyl-1-(2,5-dimethylphenyl)ethane (p-PXE) | −1 | 4,120 |
| 3 | o-Isopropyldiphenylmethane | −9 | 3,760 |
| 4 | m-Isopropyldiphenylmethane | −29 | 4,070 |
| 5 | p-Isopropyldiphenylmethane | −11 | 3,740 |
| 6 | p-Isopropylbiphenyl | +17 | 3,940 |

TABLE 3

| Insulating Oil No. | | 1 | 2 | 3 | 4 | 5 | 6 | 7 | 8 |
|---|---|---|---|---|---|---|---|---|---|
| Composition (wt %) | | | | | | | | | |
| (a) m-Ethylbiphenyl | | 50.2 | 31.4 | 50.2 | 31.3 | 50.2 | 31.4 | — | — |
| (b) p-Ethylbiphenyl | | 29.8 | 18.6 | 29.8 | 18.6 | 29.8 | 18.6 | — | — |
| (c) o-Benzyltoluene | | — | — | — | — | — | — | 39.2 | 24.5 |
| (d) m-Benzyltoluene | | — | — | — | — | — | — | 5.4 | 3.4 |
| (e) p-Benzyltoluene | | — | — | — | — | — | — | 35.4 | 22.2 |
| (f) 1,1-Diphenylethane | | — | — | — | — | — | — | — | — |
| m-PXE | | 6.4 | 15.9 | — | — | — | — | 6.4 | 15.9 |
| p-PXE | | 1.8 | 4.5 | — | — | — | — | 1.8 | 4.5 |
| PXE mixture | | 11.8 | 29.6 | — | — | — | — | 11.8 | 29.5 |
| o-Isopropyldiphenylmethane | | — | — | 5.7 | 14.2 | — | — | — | — |
| m-Isopropyldiphenylmethane | | — | — | 2.3 | 5.8 | — | — | — | — |
| p-Isopropyldiphenylmethane | | — | — | 12.0 | 30.1 | — | — | — | — |
| 1-Phenyl-1-ethyphenylethane | | — | — | — | — | 20.0 | 50.0 | — | — |
| m-Isopropylbiphenyl | | — | — | — | — | — | — | — | — |
| p-Isopropylbiphenyl | | — | — | — | — | — | — | — | — |
| Quantity of Solid | R.T. | 0 | 0 | 0 | 0 | 0 | 0 | 0 | 0 |
| Phase (wt %) | −40° C. | 9.9 | 0 | 9.9 | 0 | 9.9 | 0 | 62.4 | 21.6 |
| | −50° C. | 52.7 | 3.0 | 52.7 | 3.6 | 52.7 | 3.0 | 68.2 | 35.5 |
| Total (a)-(f) in | R.T. | 80.0 | 50.0 | 80.0 | 49.9 | 80.0 | 50.0 | 80.0 | 50.1 |
| Liquid Phase (wt %) | −40° C. | 77.8 | 50.0 | 77.8 | 50.0 | 77.8 | 50.0 | 46.9 | 36.2 |
| | −50° C. | 57.8 | 48.5 | 57.8 | 48.7 | 57.8 | 48.5 | 36.9 | 24.7 |
| Viscosity of | −40° C. | 350 | 1,000 | 150 | 130 | 190 | 210 | 700 | 1,200 |
| Liquid Phase (cSt) | −50° C. | 2,900 | 4,500 | 360 | 340 | 610 | 650 | 4,400 | 9,600 |
| PDIV 1 sec Value | R.T. | 120/116 | 119/112 | 118/111 | 112/107 | 118/115 | 115/106 | 125/120 | 121/116 |
| Max/min (V/μ) | −40° C. | 84/73 | 68/59 | 89/77 | 90/79 | 88/77 | 86/75 | 63/39 | 66/52 |
| | −50° C. | 59/35 | 63/50 | 76/47 | 80/69 | 66/42 | 73/65 | 41/25 | 59/50 |

| Insulating Oil No. | 9 | 10 | 11 | 12 | 13 |
|---|---|---|---|---|---|
| Composition (wt %) | | | | | |
| (a) m-Ethylbiphenyl | — | — | — | — | — |
| (b) p-Ethylbiphenyl | — | — | — | — | — |
| (c) o-Benzyltoluene | 39.2 | 24.5 | 39.2 | 19.6 | 19.6 |
| (d) m-Benzyltoluene | 5.4 | 3.4 | 5.4 | 2.7 | 2.7 |
| (e) p-Benzyltoluene | 35.4 | 22.2 | 35.4 | 17.7 | 17.7 |
| (f) 1,1-Diphenylethane | — | — | — | 40.0 | 40.0 |
| m-PXE | — | — | — | 6.4 | — |
| p-PXE | — | — | — | 1.8 | — |
| PXE mixture | — | — | — | 11.8 | — |
| o-Isopropyldiphenylmethane | — | — | — | — | 5.7 |
| m-Isopropyldiphenylmethane | — | — | — | — | 2.3 |

TABLE 3-continued

|  |  |  |  |  |  |  |
|---|---|---|---|---|---|---|
| p-Isopropyldiphenylmethane |  | — | — | — | — | 12.0 |
| 1-Phenyl-1-ethyphenylethane |  | — | — | 20.0 | — | — |
| m-Isopropylbiphenyl |  | 12.7 | 31.7 | — | — | — |
| p-Isopropylbiphenyl |  | 7.3 | 18.2 | — | — | — |
| Quantity of Solid | R.T. | 0 | 0 | 0 | 0 | 0 |
| Phase (wt %) | −40° C. | 61.7 | 25.6 | 62.4 | 5.1 | 5.1 |
|  | −50° C. | 72.5 | 47.0 | 68.3 | 55.5 | 55.5 |
| Total (a)–(f) in | R.T. | 80.0 | 50.1 | 80.0 | 80.0 | 80.0 |
| Liquid Phase (wt %) | −40° C. | 47.8 | 37.9 | 46.9 | 78.7 | 78.9 |
|  | −50° C. | 40.5 | 26.9 | 36.9 | 55.1 | 55.1 |
| Viscosity of | −40° C. | 360 | 500 | 140 | 180 | 84 |
| Liquid Phase (cSt) | −50° C. | 1,700 | 3,400 | 430 | 1,800 | 210 |
| PDIV 1 sec Value | R.T. | 130/121 | 124/118 | 124/119 | 123/117 | 122/113 |
| Max/min (V/μ) | −40° C. | 72/49 | 65/48 | 77/49 | 88/75 | 92/81 |
|  | −50° C. | 44/28 | 45/37 | 70/46 | 44/29 | 71/48 |

One of the conclusions obtained from the results in Table 3 is that the ratios of the respective position isomers must be selected carefully in preparing insulating oil compositions, since the quantity of each isomer can have a great influence on the performance of capacitors.

For example, Insulating Oil Nos. 1 and 2 were made by mixing ethylbiphenyl and 1-phenyl-1-xylylethane but the quantities of the individual components differed. Even though the quantities of solid phase of both the oils were less than 45% and the total (a)-(f)'s in liquid phase were also less than 40%, the viscosity of liquid phase of Oil No. 2 exceeds 500 cSt. Further, as compared with Oil No. 1, the maximum and the minimum in PDIV 1 sec values at −40° C. for Oil No. 2 were significantly lower. Therefore, Oil No. 1 met all four criteria as to identification of components, the percentage of solid phase at −40° C., the quantity of (a) to (f) components in the liquid phase at −40° C. and the viscosity of the liquid phase at −40° C. and is within the claimed invention while insulating Oil No. 2 met all criteria except for the viscosity and is outside the claimed invention. The electrical performance of the two oils confirmed this.

Further, a similar comparison can be made between Insulating Oil Nos. 3 and 4 which were made by mixing the same isomers but different quantities of ethylbiphenyl and isopropyldiphenylmethane. Comparing the data at −50° C., the total (a)-(f)'s in the liquid phase of both oils were less than 40% and the viscosities of both liquid phases were lower than 500 cSt. However, the quantity of solid phase in Oil No. 3 exceeds 45%. Due to this fact, as compared with Oil No. 4, the maximum and the minimum in PDIV 1 sec values at −50° C. for Oil No. 3 were lower than those for Oil No. 4. Especially significant is the fact that the difference between the maximum and minimum values for Oil No. 3 is 29 V/μ, which is substantially larger than 11 V/μ difference for Oil No. 4. This fact means that the partial discharge of capacitor of Oil No. 3 occurs at a lower voltage, and the partial discharge as started is unstable Oil No. 4 is within the subject invention while Oil No. 3 is not.

What is claimed is:

1. In a method of preparing an electrical capacitor including the steps comprising:
   (i) rolling a metal foil electrode together with a dielectric material in layers to provide capacitor elements,
   (ii) disposing said elements in a container and
   (iii) impregnating said elements with an electrical insulating oil which can be used at temperatures as low as −40° C., the improvement which comprises:

employing as said electrical insulating oil an oil composition comprising 45% by weight or more of at least 2 members selected from the group consisting of the following 6 components and the remainder of non-condensed bicyclic aromatic hydrocarbons having not more than 17 carbon atoms except said 6 components:
   (a) m-ethylbiphenyl,
   (b) p-ethylbiphenyl,
   (c) o-benzyltoluene,
   (d) m-benzyltoluene,
   (e) p-benzyltoluene, and
   (f) 1,1-diphenylethane and is characterized in that, when the temperature of said composition is −40° C.,
   (I) the total quantity of solid phase obtained by calculating according to the following solid-liquid equilibrium equation is 45% by weight or less relative to the total quantity of said composition, and
   (II) in the liquid phase composition calculated by the following solid-liquid equilibrium equation, the total quantity of said compounds (a) to (f) is 40% by weight or more and the viscosity of this liquid phase is 500 cSt or lower, $$X_i = \exp\left[\frac{\Delta H_i^f}{R}\left(\frac{1}{T_i^f} - \frac{1}{T}\right)\right]$$

wherein
$X_i$ is the equilibrium mole fraction of a component i in the liquid phase of said composition,
$\Delta H_i^f$ is the heat of fusion (cal.mol$^{-1}$) of said component i as a pure substance,
$T_i^f$ is the melting point (K) of said component i as a pure substance,
T is the temperature (K) of the system, and
R is the gas constant (cal.mol$^{-1}$.K$^{-1}$)

2. The method of claim 1 wherein the temperature of step (iii) is −50° C. and the portion of solid phase is at a temperature of −50° C.

3. The method of claim 1 wherein the dielectric material is a plastic film.

4. The method of claim 3 wherein the plastic film is a polyolefin film.

5. The method of claim 4 wherein the polyolefin film is polypropylene film.

6. In the method of operating an oil filter capacitor of the type capable of operating at temperatures as low as "40° C., said method including the steps of charging and discharging said capacitor at a temperature as low as −40° C., the improvement which comprises:

employing as said electrical insulating oil an oil composition comprising 45% by weight or more of at least 2 members selected from the group consisting of the following 6 components and the remainder of non-condensed bicyclic aromatic hydrocarbons having not more than 17 carbon atoms except said 6 components:
(a) m-ethylbiphenyl,
(b) p-ethylbiphenyl,
(c) o-benzyltoluene,
(d) m-benzyltoluene,
(e) p-benzyltoluene, and
(f) 1,1-diphenylethane and is characterized in that, when the temperature of said position is −40° C.,
(I) the total quantity of solid phase obtained by calculating according to the following solid-liquid equilibrium equation is 45% by weight or less relative to the total quantity of said composition, and
(II) in the liquid phase composition calculated by the following solid-liquid equilibrium equation, the total quantity of said compounds (a) to (f) is 40% by weight or more and the viscosity of this liquid phase is 500 cSt or lower, $$X_i = \exp\left[\frac{\Delta H_i^f}{R}\left(\frac{1}{T_i^f} - \frac{1}{T}\right)\right]$$

wherein
$X_i$ is the equilibrium mole fraction of a component i in the liquid phase of said composition,
$\Delta H_i^f$ is the heat of fusion (cal.mol$^{-1}$) of said component i as a pure substance,
$T_i^f$ is the melting point (K) of said component i as a pure substance,
T is the temperature (K) of the system, and
R is the gas constant (cal.mol$^{-1}$.K$^{-1}$)

7. The method of claim 6 wherein the operating temperature is as low as −50° C. and the charging and discharging is at a temperature as low as −50° C.

8. The method of claim 6 wherein the capacitor comprises a dielectric material of a plastic film.

9. The method of claim 8 wherein the plastic film is a polyolefin film.

10. The method of claim 9 wherein the polyolefin film is polypropylene film.

* * * * *

UNITED STATES PATENT AND TRADEMARK OFFICE
CERTIFICATE OF CORRECTION

PATENT NO. : 5,081,758

DATED : January 21, 1992

INVENTOR(S) : Atsushi Sato, et al.

It is certified that error appears in the above-identified patent and that said Letters Patent is hereby corrected as shown below:

ON THE TITLE PAGE:

In the Abstract, line 6: "bicycle" should read as --bicyclic--

Column 3, line 33: after "2-methylbiphenyl" insert --,--

Column 6, line 56: "30° C" should read as -- -30° C--

Column 13, line 47: "-40°" should read as -- -40° C--

Column 16, line 25: "probability, practically" should read as --probability.  Practically--

Column 18, line 26: "Par-" should read as --par- --

Column 19, line 56: "unstable" should read as --unstable.--

Column 20, line 67, Claim 6: "40° C" should read as -- -40° C--

UNITED STATES PATENT AND TRADEMARK OFFICE
CERTIFICATE OF CORRECTION

PATENT NO. : 5,081,758

DATED : January 21, 1992

INVENTOR(S) : Atsushi Sato, et al

It is certified that error appears in the above-identified patent and that said Letters Patent is hereby corrected as shown below:

Column 20, line 67, Claim 6: "40°C" should read as -- -40° C--.

Signed and Sealed this

Twentieth Day of July, 1993

Attest:

MICHAEL K. KIRK

*Attesting Officer*  *Acting Commissioner of Patents and Trademarks*